(12) United States Patent
Anderson et al.

(10) Patent No.: US 7,966,391 B2
(45) Date of Patent: Jun. 21, 2011

(54) SYSTEMS, APPARATUS AND METHODS FOR MANAGING NETWORKING DEVICES

(75) Inventors: Todd J. Anderson, Charlotte, NC (US); Bradley S. Ross, Huntersville, NC (US); Mark P. Phillipi, Fort Mill, SC (US)

(73) Assignee: Todd J. Anderson, Charlotte, NC (US)

( * ) Notice: Subject to any disclaimer, the term of this patent is extended or adjusted under 35 U.S.C. 154(b) by 933 days.

(21) Appl. No.: 11/125,165

(22) Filed: May 10, 2005

(65) Prior Publication Data
US 2005/0267928 A1 Dec. 1, 2005

Related U.S. Application Data

(60) Provisional application No. 60/569,620, filed on May 11, 2004.

(51) Int. Cl.
*G06F 15/173* (2006.01)
(52) U.S. Cl. ........ 709/223; 709/224; 709/225; 707/201; 707/203; 703/22
(58) Field of Classification Search .......... 709/223–226; 707/201, 203; 703/22
See application file for complete search history.

(56) References Cited

U.S. PATENT DOCUMENTS

| | | | | |
|---|---|---|---|---|
| 5,265,092 A * | 11/1993 | Soloway et al. | ............... | 370/238 |
| 5,434,994 A * | 7/1995 | Shaheen et al. | ............... | 709/223 |
| 5,832,503 A | 11/1998 | Malik et al. | | |
| 5,960,439 A | 9/1999 | Hamner et al. | | |
| 6,065,062 A * | 5/2000 | Periasamy et al. | ............ | 709/242 |
| 6,088,717 A * | 7/2000 | Reed et al. | ..................... | 709/201 |
| 6,161,139 A * | 12/2000 | Win et al. | ...................... | 709/225 |
| 6,243,815 B1 * | 6/2001 | Antur et al. | ..................... | 726/11 |
| 6,252,858 B1 | 6/2001 | Inoue | | |
| 6,335,927 B1 * | 1/2002 | Elliott et al. | .................. | 370/352 |
| 6,345,294 B1 * | 2/2002 | O'Toole et al. | ............... | 709/222 |
| 6,349,306 B1 | 2/2002 | Malik et al. | | |
| 6,473,794 B1 * | 10/2002 | Guheen et al. | ................ | 709/223 |
| 6,519,248 B1 | 2/2003 | Valko et al. | | |
| 6,615,166 B1 * | 9/2003 | Guheen et al. | .................. | 703/27 |
| 6,615,201 B1 | 9/2003 | Seshadri et al. | | |
| 6,615,218 B2 | 9/2003 | Mandal et al. | | |
| 6,636,889 B1 * | 10/2003 | Estrada et al. | ................ | 709/203 |
| 6,671,757 B1 * | 12/2003 | Multer et al. | ................. | 710/100 |

(Continued)

OTHER PUBLICATIONS

20030229686, United Kingdom, Kris Kortright, Dec. 11, 2003.

*Primary Examiner* — Kevin Bates
*Assistant Examiner* — Marcus McKenzie
(74) *Attorney, Agent, or Firm* — James J. Bindseil

(57) ABSTRACT

Provided are systems, apparatus and methods for the management and control of a plurality of networking devices. Embodiments include a database at each node of a communications network, where the database stores all networking and/or security data associated with each networking device at all nodes. Further, a replication module communicates any networking and/or security data changes to the databases, and insures that each database has the same information. Other embodiments may include an adaptive networking module operable to analyze and optimize the behavior, performance and/or security of the networking devices, and a simulation module to insure that any optimization-related changes do not adversely affect any of the networking devices. Therefore, the network management systems, apparatus and methods advantageously provide a decentralized system of all networking and/or security data that allows each network node to individually optimize its, and the entire network's, networking performance and security.

30 Claims, 9 Drawing Sheets

U.S. PATENT DOCUMENTS

| | | | | |
|---|---|---|---|---|
| 6,704,873 B1 * | 3/2004 | Underwood | | 726/12 |
| 6,725,281 B1 * | 4/2004 | Zintel et al. | | 719/318 |
| 6,731,625 B1 * | 5/2004 | Eastep et al. | | 370/352 |
| 6,795,823 B1 * | 9/2004 | Aklepi et al. | | 709/238 |
| 6,915,309 B1 * | 7/2005 | Conley et al. | | 707/104.1 |
| 6,988,208 B2 * | 1/2006 | Hrabik et al. | | 726/23 |
| 7,003,546 B1 * | 2/2006 | Cheah | | 709/200 |
| 7,130,870 B1 * | 10/2006 | Pecina et al. | | 707/203 |
| 7,155,466 B2 * | 12/2006 | Rodriguez et al. | | 707/205 |
| 7,168,093 B2 * | 1/2007 | Hrabik et al. | | 726/22 |
| 7,219,134 B2 * | 5/2007 | Takeshima et al. | | 709/217 |
| 7,290,056 B1 * | 10/2007 | McLaughlin, Jr. | | 709/230 |
| 7,315,826 B1 * | 1/2008 | Guheen et al. | | 705/7 |
| 7,370,064 B2 * | 5/2008 | Yousefi'zadeh | | 707/200 |
| 7,376,969 B1 * | 5/2008 | Njemanze et al. | | 726/22 |
| 7,401,148 B2 * | 7/2008 | Lewis | | 709/228 |
| 7,424,743 B2 * | 9/2008 | Hrabik et al. | | 726/22 |
| 7,511,614 B2 * | 3/2009 | Stilp et al. | | 340/541 |
| 2001/0042073 A1 * | 11/2001 | Saether et al. | | 707/203 |
| 2002/0010679 A1 * | 1/2002 | Felsher | | 705/51 |
| 2002/0026434 A1 | 2/2002 | Krebs et al. | | |
| 2002/0029227 A1 * | 3/2002 | Multer et al. | | 707/203 |
| 2002/0049804 A1 * | 4/2002 | Rodriguez et al. | | 709/200 |
| 2002/0099787 A1 | 7/2002 | Bonner et al. | | |
| 2002/0099958 A1 * | 7/2002 | Hrabik et al. | | 713/201 |
| 2002/0129128 A1 * | 9/2002 | Gold et al. | | 709/220 |
| 2002/0152299 A1 * | 10/2002 | Traversat et al. | | 709/223 |
| 2002/0178383 A1 * | 11/2002 | Hrabik et al. | | 713/201 |
| 2002/0194207 A1 * | 12/2002 | Bartlett et al. | | 707/203 |
| 2002/0194335 A1 * | 12/2002 | Maynard | | 709/225 |
| 2002/0194497 A1 | 12/2002 | McGuire | | |
| 2003/0051026 A1 * | 3/2003 | Carter et al. | | 709/224 |
| 2003/0051170 A1 * | 3/2003 | Spearman | | 713/201 |
| 2003/0061518 A1 * | 3/2003 | Yamaguchi et al. | | 713/201 |
| 2003/0097426 A1 * | 5/2003 | Parry | | 709/220 |
| 2003/0101283 A1 * | 5/2003 | Lewis et al. | | 709/246 |
| 2003/0130984 A1 * | 7/2003 | Quinlan et al. | | 707/1 |
| 2003/0131028 A1 | 7/2003 | Radi et al. | | |
| 2003/0204557 A1 * | 10/2003 | Mandal et al. | | 709/202 |
| 2003/0217119 A1 * | 11/2003 | Raman et al. | | 709/219 |
| 2003/0236867 A1 * | 12/2003 | Natsuno et al. | | 709/220 |
| 2004/0030739 A1 * | 2/2004 | Yousefi'zadeh | | 709/201 |
| 2004/0143428 A1 * | 7/2004 | Rappaport et al. | | 703/22 |
| 2004/0212503 A1 * | 10/2004 | Stilp | | 340/572.1 |
| 2004/0215750 A1 * | 10/2004 | Stilp | | 709/220 |
| 2004/0255167 A1 * | 12/2004 | Knight | | 713/201 |
| 2005/0097146 A1 * | 5/2005 | Konstantinou et al. | | 707/200 |
| 2005/0120025 A1 * | 6/2005 | Rodriguez et al. | | 707/10 |
| 2005/0149582 A1 * | 7/2005 | Wissmann et al. | | 707/201 |
| 2005/0184857 A1 * | 8/2005 | Roatis et al. | | 340/5.73 |
| 2005/0216524 A1 * | 9/2005 | Gomes et al. | | 707/201 |
| 2006/0190576 A1 * | 8/2006 | Lee et al. | | 709/223 |
| 2006/0195716 A1 * | 8/2006 | Bittner | | 714/6 |

* cited by examiner

Networking Services Module 29

Service Specific Instructions 148

Networking Service Application 150

*Fig. 3*

Translator Module 31

Networking Level Instructions 146

Translator Mechanism 144

Service Specific Instructions 148

*Fig. 4*

Replication Module 28

Existing Networking/ Security Database Data 23

Replication Mechanism 154

Updated Networking/ Security Database Data 158

*Fig. 5*

SYSTEMS, APPARATUS AND METHODS FOR MANAGING NETWORKING DEVICES

RELATED APPLICATIONS

The present application is based on, and claims priority from, Provisional Application No. 60/569,620 entitled "Systems and Methods for Managing Networking Devices" filed May 11, 2004, hereby expressly incorporated by reference herein.

BACKGROUND

The described embodiments relate to communications networks, and in particular, to systems, apparatus and methods of managing networking devices and associated networked devices.

Transmitting data through groups of interconnected computer systems is an increasingly important and complex aspect of everyday business and life. For example, many computer systems may be interconnected through a public, heterogeneous communications network, such as the Internet. A grouping of these interconnected computer systems may be organized to form a managed communications network. Such a communications network requires management of the associated networking devices, such as routers, firewalls, etc., to insure a reliable, secure and optimized flow of data across the network. Networking devices, therefore, provide the link between the computer systems, such as personal computers, servers, etc., and the transmission media, such as wireless, wireline, cable, optical, and satellite communications systems, and allow for transmitting data across the communications network.

Current systems and methods for managing networking devices are complicated and heterogeneous, however, thus creating problems for a system manager wanting to control a group of networking devices. Each node or site on a communications network typically includes a number of different networking devices, each requiring different commands, protocols and languages to control them. Additionally, each type of networking device requires a separate network management interface or console, typically located at a centralized data center, to enter the device-specific commands and protocols to control the networking device. Further, the various network management consoles typically do not share information due to the device-specific commands associated with each console. This creates complexity in the management of the entire group of networking devices as, for example, a change on one networking device (e.g. a router) invariably requires a change to be made in another networking device (e.g. firewall) at a separate console with separate commands and protocols. There is no provision for the sharing of data and mapping of the interrelationship of networking services amongst management consoles, or networking devices at each site, because the different networking devices are controlled by separate, distinct management interfaces that do not communicate. Therefore, in changing a configuration of a networking device, a system manager must individually send commands to each device in its own language from its own management interface. Thus, management of the group of networking devices on a communications network becomes a complicated and cumbersome task that is compounded as the network grows and as new networking devices are added.

Further, networking technologies and security threats continue to develop at a rapid pace. The traditional response to these changes in technology is to wait for the market to design and manufacture another purpose-built networking device, e.g. a physical device with dedicated hardware, that incorporates the new technology or addresses the new threat. Such a purpose-built device adds increasing expense to managing a communications network, as it must be purchased, installed and supported. This proliferation of purpose-built networking devices may be defined as "device creep"—where networking appliances proliferate across a network, leading to expensive management costs, vendor finger-pointing and laborious troubleshooting.

Therefore, what is needed is a system and method for improving the ability of a system manager to manage and control a group of networking devices.

BRIEF DESCRIPTION

In accordance with one embodiment, a network management system comprises a networking database module disposed at a first one of a plurality of nodes of a communications network. The networking database module comprising a data repository having a plurality of networking device configuration data corresponding to a plurality of networking devices each associated with one of the plurality of nodes. Further, the networking database module is operable to store a control version of the data repository at the first node, and operable to transmit at least a portion of the control version to, at least, a second one of the plurality of nodes to define a distributed version of the data repository. The plurality of networking device configuration data in control version and the distributed version are identical.

In another embodiment, a network system comprises a first data repository associated with a master networking device at a first node of a plurality of nodes on a communications network, where the first data repository comprises at least networking device configuration data relating to a functionality of the master networking device. The system also includes a second data repository associated with each of a plurality of distributed networking devices at each of the remaining nodes of the plurality of nodes, where the networking device configuration data further comprises data relating to a functionality of each of the plurality of distributed networking devices. The second data repository is synchronizable with the first data repository.

In another embodiment, a networking system comprises a predetermined plurality of networking devices associated with a predetermined plurality of interconnected nodes of a communications network, where each of the predetermined plurality of nodes includes at least one of the predetermined plurality of networking devices. The system also includes a first networking database at a first one of the predetermined plurality of nodes, where the first networking database comprises a first set of at least one of networking data and security data associated with each one of the predetermined plurality of networking devices at each one of the predetermined plurality of nodes. And, the system also includes a second networking database at each of the remaining ones of the predetermined plurality of nodes, where each second networking database comprises a second set of at least one of networking data and security data. Further, the system includes a replication module operable to synchronize each second networking database with the first networking database such that each second set of at least one of networking data and security data is identical to the first set of at least one of networking data and security data.

In still another aspect, one embodiment of an apparatus comprises a distributed version of a networking database at one of a plurality of nodes of a communications network. The distributed version of the networking database comprising at least one of networking data and security data associated with each of a plurality of networking devices respectively located at each of the plurality of nodes. The distributed version of the networking database is synchronizable with a control version of the networking database at a first one of the plurality of nodes.

In yet another embodiment, a method of managing a communications network comprises maintaining a first data repository at a first one of a plurality of nodes each having at least one networking device, where the first data repository comprises at least networking device configuration data associated with the at least one networking device at each of the plurality of nodes. The method further includes causing a synchronization of a second data repository at, at least, a second one of a plurality of nodes with the first data repository.

In a further embodiment, a method of adaptive networking comprises receiving performance data or security data associated with a first networking device of a plurality of networking devices that each manage communications through one of a plurality of nodes in a communications network. The method also includes comparing the received performance data or security data to a predetermined standard and identifying anomalous data. Further, proposed performance-related networking device configuration data or proposed security-related networking device configuration data based on the identified anomalous data is generated, where the proposed performance-related networking device configuration data or the proposed security-related networking device configuration data respectively results in new performance data or new security data falling within the predetermined standard. Also, the method includes updating and synchronizing a data repository associated with each of the plurality of networking devices with the proposed performance-related configuration data or proposed security-related configuration data.

In still another embodiment, a computer program product comprises a computer-usable medium having control logic stored therein for causing a computer to manage networking information. The control logic comprises a first computer readable program code for maintaining a first data repository at a first one of a plurality of nodes each having at least one networking device, where the first data repository comprises at least networking device configuration data associated with the at least one networking device at each of the plurality of nodes. The control logic also comprises a second computer readable program code for causing a synchronization of a second data repository at, at least, a second one of a plurality of nodes with the first data repository.

In another embodiment, a computer program product comprises a computer-usable medium having control logic stored therein for causing a computer to adaptively manage networking information. The control logic comprises a first computer readable program code for receiving performance data or security data associated with a first networking device of a plurality of networking devices that each manage communications through one of a plurality of nodes in a communications network. The control logic also comprises a second computer readable program code for comparing the retrieved performance data or security data to a predetermined standard and identifying anomalous data. Further, the control logic comprises a third computer readable program code for generating proposed performance-related networking device configuration data or proposed security-related networking device configuration data based on the identified anomalous data, where the proposed performance-related networking device configuration data or the proposed security-related networking device configuration data respectively results in new performance data or new security data falling within the predetermined standard. And, the control logic includes a fourth computer readable program code for updating and synchronizing a data repository associated with each of the plurality of networking devices with the proposed performance-related networking device configuration data or proposed security-related networking device configuration data.

BRIEF DESCRIPTION OF THE DRAWINGS

Various embodiments will hereinafter be described in conjunction with the appended drawings provided to illustrate and not to limit the present invention, wherein like designations denote like elements, and in which:

FIG. 3 is a schematic block diagram of one embodiment of a translator module associated with the networking device of FIG. 2;

FIG. 4 is a schematic block diagram of one embodiment of a networking services module associated with the networking device of FIG. 2;

FIG. 5 is a schematic block diagram of one embodiment of a replication module associated with the networking device of FIG. 2;

DETAILED DESCRIPTION

Figure 1:
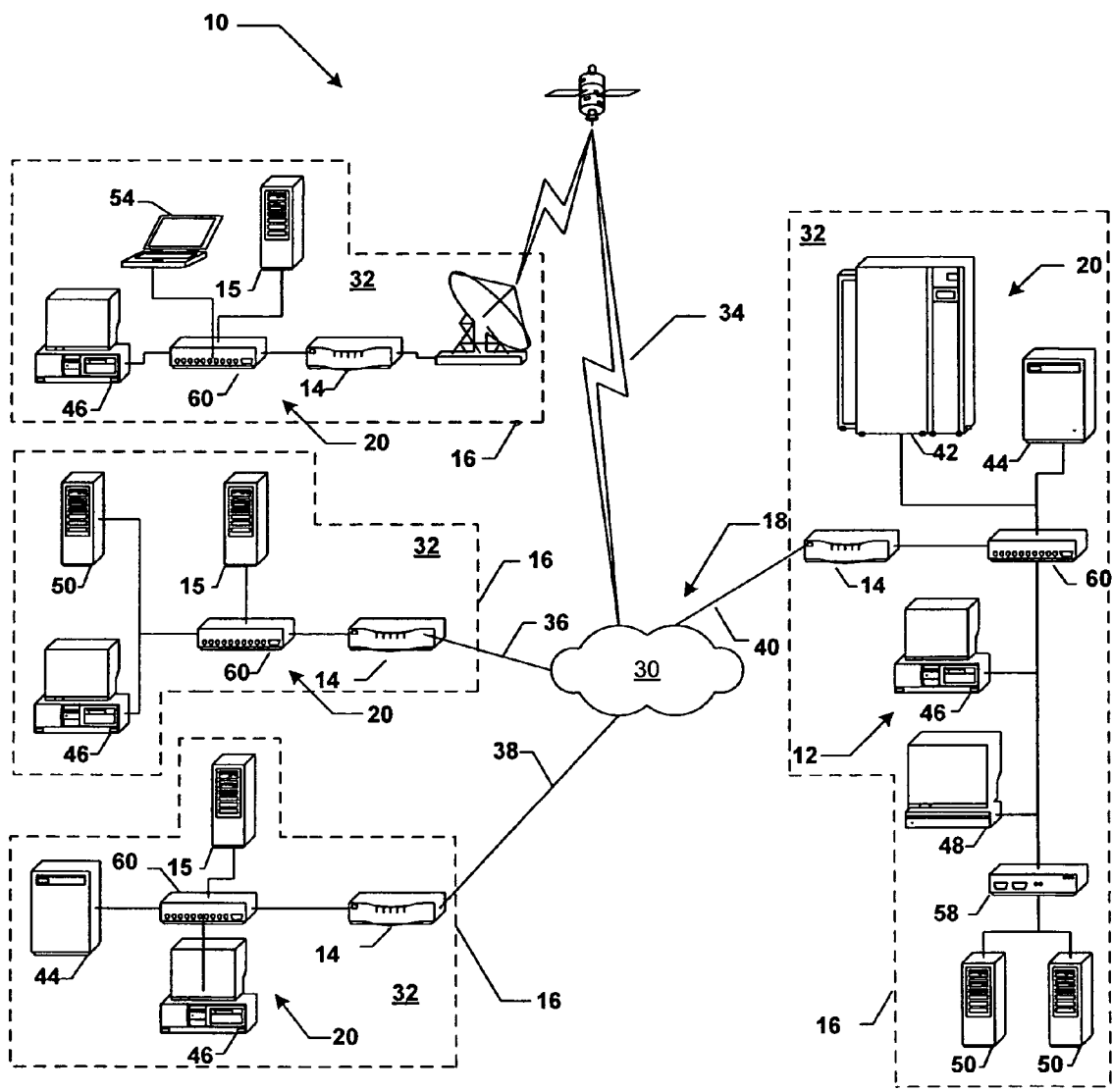
FIG. 1 is a schematic representation of one embodiment of a network management system having a networking device at each site/node and a data repository of networking and/or security data associated with each networking device in the system.
Figure 2:
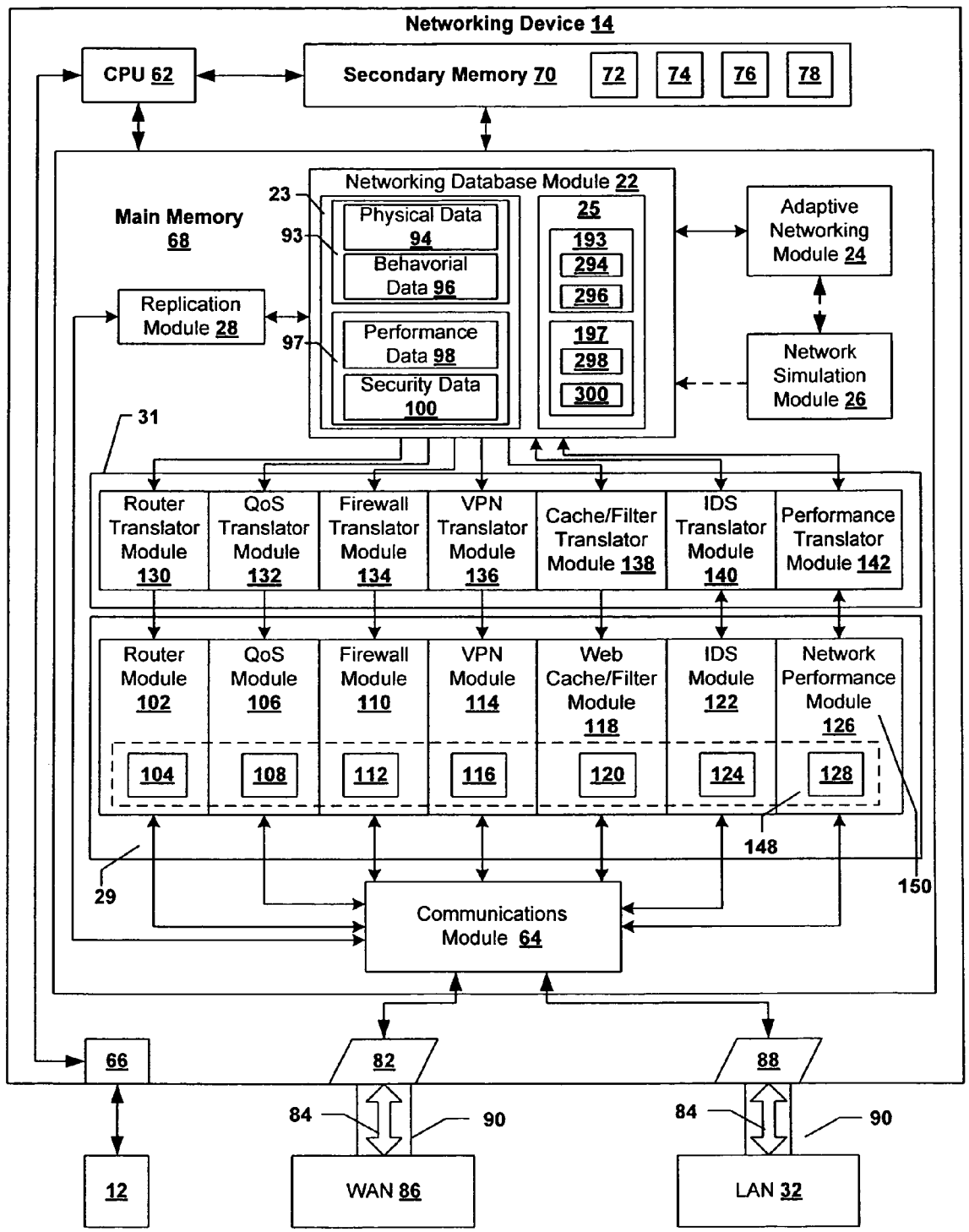
FIG. 2 is a schematic block diagram of one embodiment of the networking device of FIG. 1.

Referring to FIGS. 1 and 2, one embodiment of a network management system 10 includes a management console or module 12 for controlling a plurality of networking devices 14 at predetermined sites, gateways and/or nodes 16 on a communications network 18. Each networking device 14 includes hardware, software and/or logic for managing communications between predetermined networked devices 20 connected to the various sites/nodes 16 on communications network 18. Further, each networking device 14 includes a data repository or networking database module 22 (FIG. 2) having networking device data 23, including networking and/or security data for all networking devices 14 at each of the predetermined sites/nodes 16 on communications network 18. The networking device data 23 may include any data relating to operational networking and security characteristics of each networking device 14 and/or for any device associated with the communications network 18.

Additionally, each networking device 14 may include an adaptive networking module 24 (FIG. 2) in communication with networking database module 22 for analyzing the networking device data 23 and generating new or proposed networking device data. The new or proposed networking device data may be generated by one or more algorithms associated with adaptive networking module 24 that are designed to improve the security and/or performance of any individual networking device 14 and/or its communications connection, or all networking devices and the network that connects them. Further, adaptive networking module 24 may operate in conjunction with network simulation module 26 (FIG. 2), which, prior to acceptance, may test the new or proposed networking device data to determine their effect on the operational characteristics of any networking device 14 or the entire communications network 18. Additionally, each networking device 14 also may include a replication module 28 (FIG. 2) operable to update the resident networking database module 22 with new networking device data generated by other networking devices 14 or by a user through management console 12. Further, replication module 28 may coordinate the distribution of locally-initiated changes to networking device data 23 to other networking devices 14 on communications network 18. Also, as the networking device data 23 stored within networking database module 22 may be in the form of high-level data, commands or protocols, a translator module 31 may translate the high-level data, commands or protocols into lower-level or service-specific data, commands or protocols that may be different for each networking application within a networking services module 29.

Thus, by storing in each networking device 14 all networking device data 23 for every networking device within system 10, network management system 10 advantageously provides a decentralized peer-to-peer network of networking devices 14. Each networking device 14 thereby allows a resident adaptive networking module 24 to analyze local networking conditions and data and intelligently change networking device data 23 to optimize the behavior, performance and/or security of the resident networking device or any networking device in network 10. Further, prior to implementation, the optimization produced by such data changes may be verified by simulation module 26. And, replication module 28 communicates any networking device data 23 changes to other networking devices 14 and insures that each networking device has the same information. Therefore, network management system 10 advantageously provides a decentralized system of all networking device data 23 that allows each node 16 to individually optimize its, and the entire network's, networking performance and security.

Referring again to FIG. 1, communications network 18 includes any type of network through which two or more networked devices 20 may be interconnected to exchange data. Suitable examples of communications network 18 include, but are not limited to, one or a combination of: a public, heterogeneous communications network 30, such as the Internet; a private, heterogeneous communications network, such as a virtual private network; a private homogeneous communications network, such as a frame relay system; a local-area network 32, such as a corporate data center, a corporate regional office, or a corporate branch office; a wide-area network, such as system of interconnected local-area networks; a campus-area network; a metro-area network; and a home-area network. Such a communications network 18 also may include any type of topology, protocol and architecture, or combinations of various types of each. Further, communications network 18 may include one or more types of transmission media, such as satellite transmissions 34, cable lines 36, optical or copper wire lines such as a digital subscriber line 38, a T-1 line, a T-3 line 40, infrared transmissions, microwave transmissions, etc.

Networked devices 20 connected to communications network 18 may include any type of computing device, including hardware, software, firmware, or peripheral devices for operating the computer system. Suitable examples of networked devices 20 include, but are not limited to: a mainframe computer 42, a minicomputer 44, a personal computer 46, a workstation 48, a server 50, a laptop computer 54, a mobile phone, a pager, a portable two-way communications device, a supercomputer, a telephony device, a wireless device, a network computer, a thin client, a printer, a facsimile machine, a scanner, any device having a processor and/or a repository for data or a connection thereto, and combinations thereof. Additionally, networked devices 20 further include local area networking devices such as a switch 56, an internal router 58, a hub 60, and other similar devices, may be utilized to locally connect and manage the communications traffic between other local networked devices 20.

Management console or module 12 includes any device or software application that allows a user to interface with one or more networking devices 14. For example, console or module 12 allows a user to manipulate data stored in data repository or networking database module 22 to change the configuration of one or more networking devices 14. Further, management console or module 12 may include a processor capable of running the management application or may include a terminal device, network computer or thin client that remotely accesses the management application. Further, management console or module 12 may be integrated with one or more networking devices 14, or may be a separate system component such as a separate personal computer or terminal. As such, management console or module 12 may be a part of or directly connected to networking device 14, or may be remotely connectable with networking device 14. Additionally, management console or module 12 may include an output, such as a display unit for outputting graphics, text and other data from networking device 14, as well as an input, such as a keyboard, mouse, touchscreen, etc. for inputting data to networking device 14.

Referring again to FIG. 2, embodiments of networking device 14 may include a hardware device, a software application/computer program, or a combination thereof and may be implemented in one or more devices and/or computer systems or processing systems. For example, such networking devices 14 include, but are not limited to, any combination of one or more of: a router system, such as for determining where to send communications and data; a firewall system, such as to determine if data should be transmitted; a virtual private network system, such as to determine if data should be encrypted or unencrypted; a quality of service system, such as to manage the throughput of data; a web cache/filter system, such as to pre-fetch and/or store locally on the LAN frequently accessed data; an intrusion detection system, such as for analyzing transmissions to determine if an unauthorized party is trying to break into the network; a network performance system, such as to measure and optimize the performance of a communications connection; and other similar networking-related devices and/or applications.

In one aspect, the described embodiments are directed toward one or more computer systems capable of carrying out the functionality described herein. Networking device 14 is one example of such a computer system, and includes one or more processors such as central processing unit 62. The one or more processors may include specialized processors, for example, such as those devoted to encrypting and decrypting communications. Central processing unit 62 is connected to a communications infrastructure, such as communications module 64, which may include a communications bus, crossover bar or network, etc. Further, communications module 64 may communicate with a display interface 66 that forwards graphics, text, and other data from the communications module 64 (or from a frame buffer, not shown) for display on the display unit of network management console or module 12 (FIG. 1), or any other output device connectable with system 10. Networking device 14 also includes a main memory 68, such as random access memory (RAM) and/or read only memory (ROM), and may also include a secondary memory 70. Secondary memory 70 may include devices for allowing computer programs or other instructions to be loaded into networking device 14. For example, secondary memory 70 may include a hard disk drive or non-volatile memory chips (aka Flash RAM) 72 and/or a removable storage drive 74 that reads from and/or writes to a removable storage unit 76. Removable storage unit 76 includes a computer usable storage medium having stored therein computer software and/or data. Examples of a removable storage drive 74 and a removable storage unit 76 include: a floppy disk drive and a floppy disk; a magnetic tape drive and a magnetic tape; an optical disk drive and an optical disk; a program cartridge and cartridge interface such as that found in video game devices; a removable memory chip such as an erasable programmable read only memory (EPROM), or programmable read only memory (PROM), and associated socket; and other removable storage units and interfaces that allow software and data to be transferred from the removable storage unit 76 to networking device 14. In one embodiment, secondary memory 70 includes a back-up copy of networking database module 22.

Networking device 14 may also include one or more communications interfaces, such as first network interface 82 for exchanging data packets 84 with a wide area network 86 such as communications network 18, and second network interface 88 for exchanging data packets 84 with local area network 32. Communications interfaces 82, 88 allow software and data to be transferred between networking device 14 and external devices. Examples of communications interfaces 82, 88 may include a modem, a network interface such as an Ethernet card, a communications port, a Personal Computer Memory Card International Association (PCMCIA) slot and card, etc. Data packets or signals 84 may be electronic, electromagnetic, optical or other signals capable of being transmitted and received by communications interfaces 82, 86. These data packets or signals 84 are provided to communications interfaces 82, 88 via a communications path or channel 90, such as the transmission media as described above. As discussed above, transmission media includes a path or channel 90 that carries data packets or signals 84 and may be implemented using wire or cable, fiber optics, a telephone line, a cellular link, a radio frequency (RF) link and/or other communications channels.

Computer programs, also referred to as computer control logic, are stored in main memory 68 and/or secondary memory 70. In this document, the terms "computer program medium" and "computer usable medium" are used to refer generally to media such as a removable storage drive 74, a hard disk installed in hard disk drive 72, and signals 84. These computer program products provide software to networking device 14. Aspects of the described embodiments are directed to such computer program products. Computer programs may also be received via network interfaces 82, 88. Such computer programs, when executed, enable processor 62 and hence networking device 14 to perform aspects of the described embodiments, as discussed herein. Accordingly, such computer programs represent controllers of networking device 14. In another embodiment, aspects of the described embodiments are implemented primarily in hardware using, for example, hardware components such as dedicated networking devices, or network appliances, that may include application specific integrated circuits (ASICs) or other network service-specific hardware. In yet another embodiment, aspects of the described embodiments are implemented using a combination of both hardware and software.

In one particular embodiment, referring again to FIG. 2, main memory 68 includes one or more computer programs that allow networking device 14 and networking services module 29 to provide selected networking services to communications network 18. The functionality and characteristics of networking device 14, and hence the services provided by networking services module 29, are managed through networking database module 22 and the given set of operational networking device data 23. Networking device data 23 includes configuration data 93 and status-related data 97 for each networking device 14 and/or other predetermined communications-related devices/features associated with network management system 10 and communications network 18. Configuration data 93 includes data that identifies and governs predetermined components and functions associated with each networking device or a communications-related aspect of the network. Status-related data 97 includes data that defines a state or condition of a given networking device or a communications-related aspect of the network. In one embodiment, for example, configuration data 93 includes: physical data 94 that identifies each site 16 and each networking device 14, such as a physical location and IP address, a subnet mask, and a gateway IP address; and behavioral data 96 that governs one or more functionalities of each networking device 14, such as routing tables, firewall rules sets, virtual private network definitions, etc. In one embodiment, status-related data 97 includes: performance data 98 that documents the actual operation and execution of one or more functions of each networking device 14, such as device status, data packet size, data throughput, bandwidth, network path, round trip transit time, latency and jitter of any given network connection, or the overall performance of network management system 10, such as the aggregate performance data for each networking device on the wide area network; and security data 100 that details and tracks security-related information associated with each networking device 14, such as Intrusion Detection, Spam, and Anti-virus logs of network traffic passing through the network device, or the overall network management system 10, such as the aggregate security data of each networking device on the wide area network.

Suitable examples of networking device data 23 include, but are not limited to: routing data, firewall data, virtual private network data, encryption key data, proxy gateway data, intrusion detection data, intrusion prevention data, network forensic data, vulnerability assessment data, anti-virus data, content filter data, network anomaly data, authentication data, access control data, authorization data, spam filter data, application filter data, media access control address filter data, port filter data, physical site data, network site data, protocol data, network performance data, network control data, web cache data, quality of service data, banned data, trusted data, dynamic control configuration protocol data, networking information data, communication protocol data, and distributed site data.

Referring to FIGS. 2 and 3, networking services module 29 may include any number of networking service applications 150 that access networking database module 22 and receive configuration data 93. Networking services module 29 may include one or more of a computer program, a dedicated hardware device, or some combination thereof that provide a desired networking functionality to networking device 14. In one non-limiting example, referring to FIG. 2, networking services applications 150 include a router module 102 such as a CISCO, NORTEL, AVAYA or ENTERASYS router device, or IP INFUSION or open source routing software; a quality of service ("QoS") module 106 including a PACKETEER PACKETSHAPER or an ALLOT COMMUNICATIONS Traffic Management device, or DETERMINISTIC NETWORKS or LINUX Traffic Control or open source QoS software; a firewall module 110 including SECURE COMPUTING SIDEWINDER Firewall, NETSCREEN, WATCHGUARD, CYBERGUARD, OR SONICWALL network appliances or Checkpoint Firewall or LINUX IPTABLES or open source firewall software; a virtual private network ("VPN") module 114 may include CISCO, NORTEL, AVAYA or ENTERASYS VPN Switch devices or SSH QUICKSEC VPN or FREESWAN VPN or open source VPN software; a web cache/filter module 118 including Squid webcache or open source web cache software; an intrusion detection system ("IDS") module 122 including CISCO or NETSCREEN IDS sensor, SYMANTEC IDS or INTERNET SECURITY SYSTEMS BLACK ICE or SNORT or open source IDS software; and a network performance module 126 including devices from companies such as VENTURI, EXPAND NETWORKS, AND PERIBIT, or ROUTE SCIENCE ADAPTIVE NETWORKING or open source performance software, and a broadband network optimization application or device such as that disclosed in U.S. application Ser. No. 10/651,436, filed by the present assignee on Aug. 29, 2003 and entitled "System And Methods For Broadband Network Optimization," hereby incorporated by reference. Further, networking services module 29 may further include applications 150 for performing networking services such as intrusion prevention, spam prevention, virus prevention, content filtering and network analysis, as well as any other type of network service that may be desired depending on the application. In an alternate embodiment, for example, networking services module 29 may include primarily hardware and/or firmware specific devices that are operational in combination with an associated data repository 22 to define network management system 10.

For example, router module 102 may retrieve physical data 94 such as a network site identification, and behavioral data 96 such as the default route, static routing tables, an exterior gateway routing protocol such as border gateway protocol ("BGP") or an interior gateway routing protocol such as open shortest path first ("OSPF") routing tables. In another example, IDS module 122 may retrieve configuration data 93 such as security alert settings for monitoring data traffic by protocols (TCP, UCP, ICMP), by ports, by source or destination IP or MAC addresses.

Configuration data 93 may be in the form of service-specific data 148 such as data, commands, configurations and protocols specifically related to the operation of the particular application. For example, referring to FIG. 2, service-specific data 148 may include router specific data 104, QoS specific data 108, firewall specific data 112, VPN specific data 116, web cache/filter specific data 120, IDS specific data 124, and network performance specific data 128. Additionally, each application 150 may have service-specific data 148 in a particular format or protocol different from that of networking database module 22 and different from the other applications.

Additionally, as noted by the directions of the arrows in FIG. 2, some applications 150 within networking services module 29 may only draw configuration data 93 from networking database module 22, while other applications may further forward status-related data 97 to networking database module 22. For instance, in one embodiment, modules 102, 106, 110, 114 and 118 only receive configuration data 93 to enable them to configure themselves and perform their dedicated function. In contrast, applications that are related to monitoring or optimizing networking device 14 may provide status-related data 97, which may ultimately result in new data flowing into the other modules in the form of a configuration or rule change via adaptive networking module 24. For instance, IDS module 122 may provide security data 100 to networking database module 22, and through analysis by adaptive networking module 24 this may result in changes to configuration data 93 affecting firewall module 110, VPN module 114 and web cache/filter module 118. Similarly, network performance module 126 may provide performance data 98 to networking database module 22 and, through analysis by adaptive networking module 24, this may result in changes to configuration data 93 affecting routing module 102, QoS module 106, VPN module 114 and network performance module 126.

Translator module 31, if necessary, transforms networking device data 23 contained in networking database module 22 into one or more sets of service-specific data 148 that is understood by each respective application within networking services module 29. In one embodiment, translator module 31 includes a specific translator application that directly corresponds to each application within networking services module 29. For example, in the case described above where networking services module 29 includes modules 102, 106, 110, 114, 118, 122, 126, translator module 31 therefore includes corresponding translators, in particular a router translator module 130, a QoS translator module 132, a firewall translator module 134, a VPN translator module 136, a web cache/filter translator module 138, an IDS translator module 140, and a network performance translator module 142.

Referring to FIG. 4, in general, each module 130, 132, 134, 136, 138, 140, 142 within translator module 31 includes a translator mechanism 144, which may include programs, software, algorithms and/or instructions for converting networking level instructions 146 that correspond to the operational networking device data 23 stored in networking database module 22 into service specific data 148 that correspond to particular data, commands, configurations and/or protocols usable by each respective application within networking services module 29. It should be understood that this example is not limiting, however, and networking services module 29 and corresponding translator module 31 may include any combination of the above modules or other additional modules that address networking-related services. Further, it should be understood that translator module 31 may be an optional component of networking device 14 if networking database module 22 and networking services module 29 operate with common data, commands and/or protocols. In such an embodiment, for example, networking services module 29 may read data directly from networking database module 22.

Replication module 28 controls and manages changes, additions and/or deletions to the networking device data 23 contained within networking database module 22. As mentioned above, such changes, additions and/or deletions may be entered by a user of system 10 through management console/module 12, or may be generated by adaptive networking module 24 or possibly by networking services module 29 (such as via IDS module 122). Referring to FIG. 5, replication module 28 includes a replication mechanism 154 that compares an existing set of networking device data 23 with an updated set of networking and/or security data 158 and changes the networking database module 22 so that it matches the updated set of networking and/or security data 158. Replication module 28 may effect this change on the resident networking database module 22, as well as communicate the change to any or preferably all other networking database modules with network management system 10. Replication mechanism 154 may replace an entire existing set of networking device data 23 with an updated set of networking and/or security data 158, or it may only transmit and effect updates in the form of changes, additions and deletions to the existing set of networking device data 23. Additionally, replication module 28 may verify that changes to networking device data 23 are accessed by or transferred to networking services module 29 and each affected application 150. Further, replication module 28 may manage the back-up copy of networking database module 22 stored on secondary memory, including insuring that all changes, additions and deletions are written to the back-up copy. Suitable examples of a replication mechanism 154 include database replication functions within relational database software from Oracle, mySQL, Sybase, or IBM's DB2.

Figure 6:
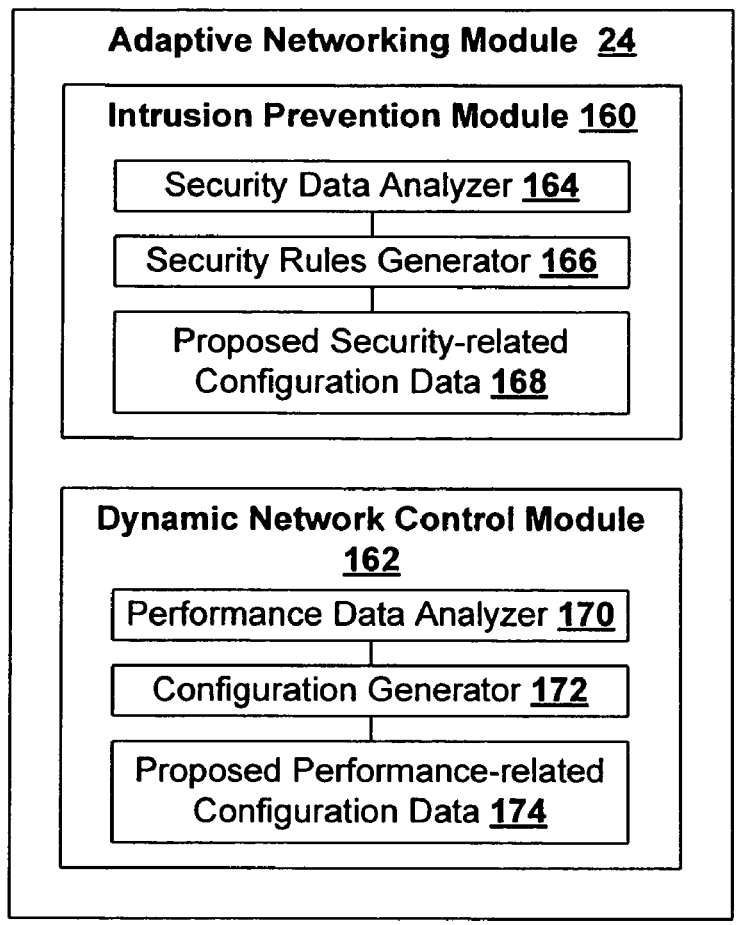
FIG. 6 is a schematic block diagram of one embodiment of a adaptive networking module associated with the networking device of FIG. 2.

Referring to FIG. 6, adaptive networking module 24 includes hardware, software, firmware or combinations thereof that enable networking device 14, and thus the entire network 18, to be self-optimizing, self-healing and self-defending. By accessing the networking device data 23 contained within networking database module 22, adaptive networking module 24 advantageously may utilize databases, heuristic programming, algorithmic programming, neural networks and/or expert or artificial intelligence systems to adjust device data, protocols, configurations, commands, settings, etc on the local networking device 14 while determining or predicting the affect of such adjustments on the other networking devices to insure system optimization. As such, adaptive networking module 24 may change networking device data 23 and, in particular, configuration data 93. In one embodiment, for example, adaptive networking module 24 includes an intrusion prevention module 160 and a dynamic networking control module 162. Intrusion prevention module 160 includes programs, firmware and/or hardware such as a security data analyzer 164 for analyzing existing security data 100 (FIG. 2), such as to identify security threats, and a security rules generator 166 for developing proposed security-related configuration data 168 to address the identified security threats to optimize the security of networking device 14 and/or the entire network 18. Additionally, security data analyzer 164 may include programs for comparing existing security data 100 to proposed security-related configuration data 168 or simulated security data 178 from simulator module 26 to determine if the proposed changes improve the security of the networking device or the system.

Dynamic networking control module 162 includes programs, firmware and/or hardware such as a performance data analyzer 170 for analyzing existing performance data 98 and a configuration generator 172 for establishing proposed performance-related configuration data 174 to optimize the performance of networking device 14 and/or of the network 18. Additionally, performance data analyzer 170 may include programs for comparing existing performance data 98 to proposed performance-related configuration data 168 or simulated performance data 182 from simulator module 26 to determine if the proposed changes improve the performance of the networking device system. The operation of and further details relating to adaptive networking module 24 are explained below in further detail.

Network simulation module 26 provides a simulation capability to networking device 14, thereby allowing proposed changes to networking database module 22 to be tested to insure desired results are achieved or to insure changes in one networking device do not adversely affect the operation of another networking device. Network simulation module 26 may include one or more network device models or network management system models, which may be formed using databases, tables, algorithms, objects, classes, methods, and any other nature of simulation of a predetermined function associated with networking device 14 or communications system 18. In one embodiment, referring to FIG. 7 for example, network simulation module 26 may include a network security model 176 that, when operated, generates a network security simulation 178 that predicts the security-related aspects of networking device 14 and/or communications network 18. For instance, network security model 176 may receive proposed security-related configuration data 168 from adaptive networking module 24, feed this data into the model, and run a simulation resulting in network security simulation 178 that includes simulated security data. Similarly, for example, network simulation module 26 may includes a network performance model 180 that, when operated, generates a network performance simulation 182 that predicts the performance-related aspects of networking device 14 and/or communications network 18. For instance, network performance model 180 may receive proposed performance-related configuration data 174 from adaptive networking module 24, feed this data into the model, and run a simulation resulting in network performance simulation 182 that includes simulated performance data. The results of each simulation 178, 182 may then be analyzed to determine their affect on any networking device 14 or the performance and security of the entire system The operation of and further details relating to network simulation module 26 are explained below in further detail.

In one embodiment of network simulation module 26, the networking devices 14 that comprise system 10 are defined by tables and fields in a relational database. The simulation of network performance and measurement of network security takes the form of rules and queries of the tables and fields in the relational database. In another embodiment, network simulation module 26 includes one class of objects that represent the network performance of specific sites on the network. Another class of objects represents the security behavior of networking devices. Methods are then defined to operate on classes of objects to represent network transmissions between network devices. In this embodiment, neural network algorithms may be applied to allow the network simulation to learn, optimize and/or secure itself through iterative changes.

Figure 8:
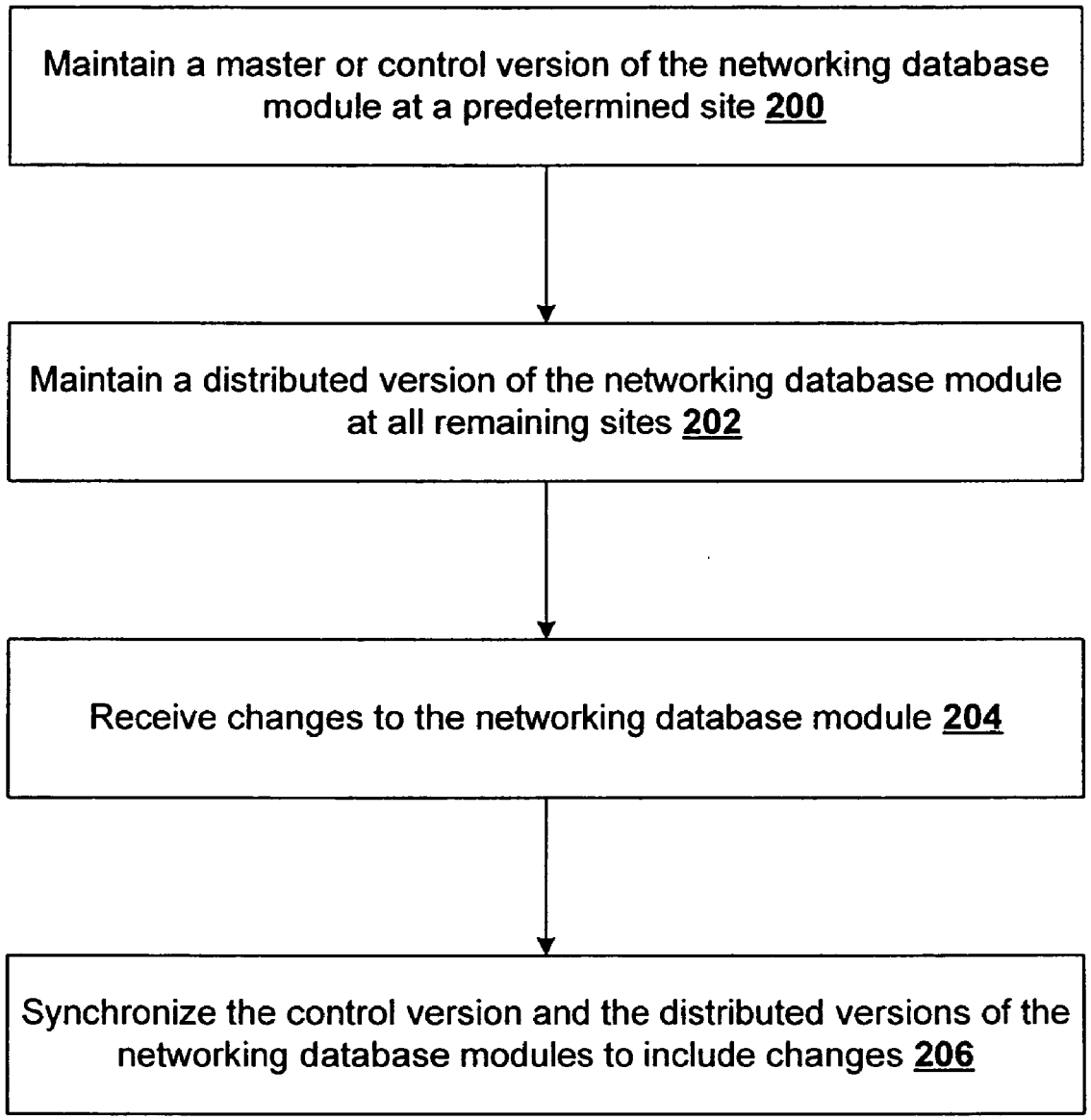
FIG. 8 is a flowchart of one embodiment of a method of managing system-wide database changes in a network management system.
Figure 10:
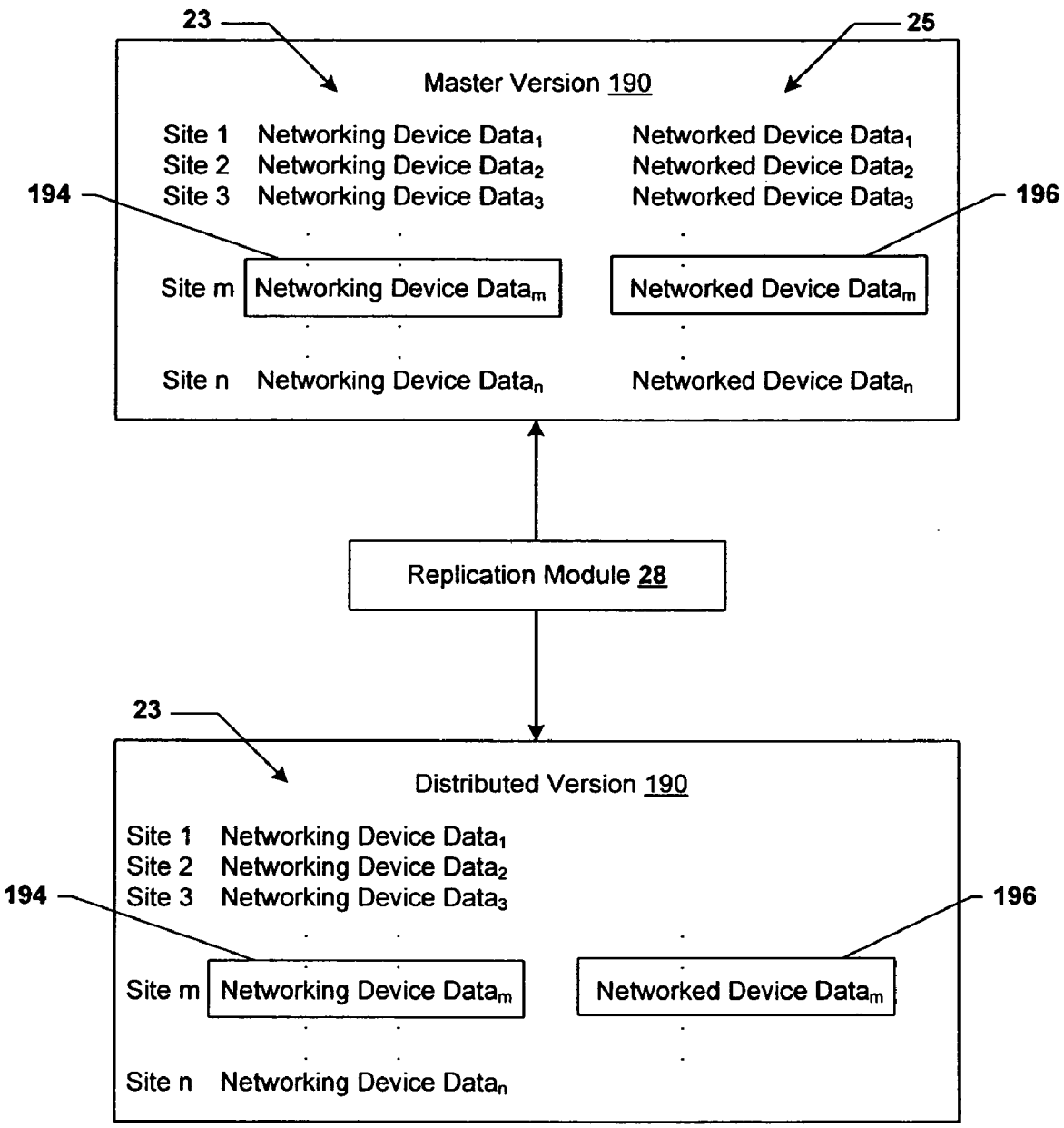
FIG. 10 is a schematic representation of one embodiment of a relationship between a master version of the data repository, the replication module and a distributed version of the data repository.

In operation, referring to FIGS. 1, 8 and 10, network management system 10 may be configured such that one networking device 14 at one site 16 maintains a master or control version 190 of data repository or networking database module 22 in order to manage system-wide changes to the database (FIG. 8, Block 200). For example, networking device 14 at a site such as a corporate data center may be designated as the master or controlling networking device. As such, the remaining networking devices 14 in the system 10 maintain a distributed or remote version 192 of data repository or networking database module 22 (Block 202). Ideally, each distributed version 192 of networking database module 22 is identical to the master version 190. As discussed above, however, each networking device 14 includes adaptive networking module 24, simulator module 26 as well as networking services module 29 that may initiate changes to their respective distributed version 192 of the networking database module 22. As such, the distributed networking devices 14 in system 10 forward any changes to their resident distributed version 192 of data repository 22 to the master networking device 14. In particular, each replication module 28 monitors its respective networking database module 22 for data changes, and forwards any data changes to the selected site 16 that contains the master version 190 of the networking database module 22 (Block 204). This monitoring may occur continuously or at predetermined times. Alternatively, any module initiating a change to its local version of networking database module 22 may notify replication module 28 of the change. Replication module 28 in the master networking device 14 then updates the master version 190 of the data repository 22 to incorporate the data changes and replicates the data changes to all of the other networking devices 14 to synchronize all sites (Block 206). The replication may occur immediately upon updating of the master version, or at a predetermined subsequent time. In turn, all of the distributed networking devices 14 receive the replicated copy to update their respective distributed version 192 of networking database module 22. In particular, each replication module 26 in each networking device 14 compares the received data changes to their respective distributed version 192 of networking database module 22 and incorporates any changes. Additionally, each replication module 28 may insure transfer of the relevant data from networking database module 22 to networking services module 29 and each respective application. Optionally, each replication module 28 also copies networking database module 22 to secondary memory 70, such as to a FLASH RAM device, to create a back-up copy of network database module 22 for each networking device 14. This back-up copy may be useful, such as to re-configure the device after a crash. Thus, whether changed through management console 12 or through its own adaptive functionality, through this process each networking device 14 maintains an identical data repository 22 via a replication process in which a master version 190 is stored at one predetermined site and synchronized with distributed copies 192 stored at all of the remaining sites.

Figure 9:
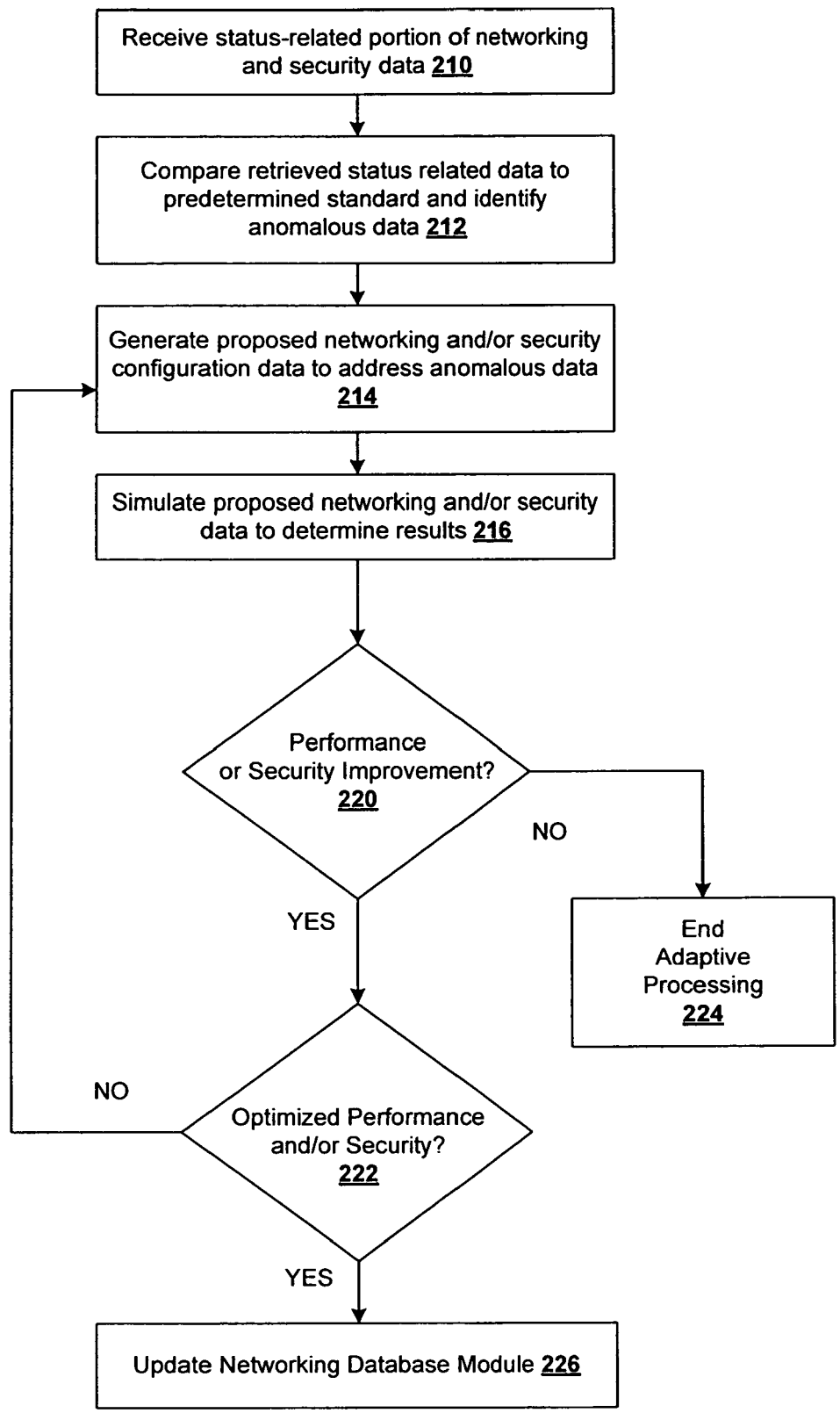
FIG. 9 is a flowchart of one embodiment of a method of adaptive network management to enhance the performance or security of a given networking device or of the entire system of networking devices.

Referring to FIG. 9, in one embodiment of a method of adaptive network management, such as to enhance the performance or security of a given networking device 14, adaptive networking module 24 may receive or retrieve at a predetermined time at least a relevant portion of networking device data 23 within networking database module 22 (Block 210). The predetermined time may be based on a routine interval, such as hourly, daily or weekly, may be user initiated, or may be based on a monitoring process. The relevant portion of networking device data 23 includes portions of the security and performance status-related data 97, such as communications statistics provided by network performance module 126 and security logs provided by IDS module 122. Upon retrieving the relevant status-related data 97, adaptive networking module 24 compares the retrieved status-related data 97 to a predetermined standard and identifies anomalous data (Block 212). For instance, adaptive networking module 24 may retrieve performance data 98 and/or security data 100 and, using performance or security data analyzer 164 or 170, compare it with predetermined standards such as a historical, steady-state level of data associated with networking device 14 or a predetermined range of data values. Alternatively, rather than waiting for the retrieved status-related data 97 to fall outside of the predetermined standards, adaptive networking module 24 may include logic, such as statistical algorithms, to predict future data points and proactively initiate changes based on the combination of the retrieved status-related data 97 and the predicted data. Examples of anomalous data include: an increase or decrease in bandwidth use or capability at a location/node; a change in data traffic patterns, such as changed usage of different ports by different applications; equipment changes on the communications network, including changed routes; persistent security attacks on a given port.

In any event, upon retrieving and identifying anomalous data, adaptive networking module 24 generates proposed networking and/or security data to address the anomalous status data to improve the performance or security of networking device 14 (Block 214). In particular, the proposed networking and/or security data may include proposed performance-related configuration data 168 (FIG. 6), such as a new route, and proposed security-related configuration data 174 (FIG. 6), such as a new firewall rule, to increase the performance or security of networking device 14. For example, in analyzing performance data 98, adaptive networking module 24 may discover that an Internet Service Provider ("ISP") has added a new higher capacity router or changed a routing path. Module 24 may then generate proposed performance-related configuration data in the form of increased packet size or proposed physical data in the form of a new router table that may be utilized by routing module 102 to account for these types of identified anomalous performance data. Similarly, in analyzing security data 100, adaptive networking module 24 may discover a security threat in the form of a hacker and generate proposed security-related configuration data in the form of a firewall rule that may be utilized by firewall module 110 to stop this particular security threat.

Figure 7:
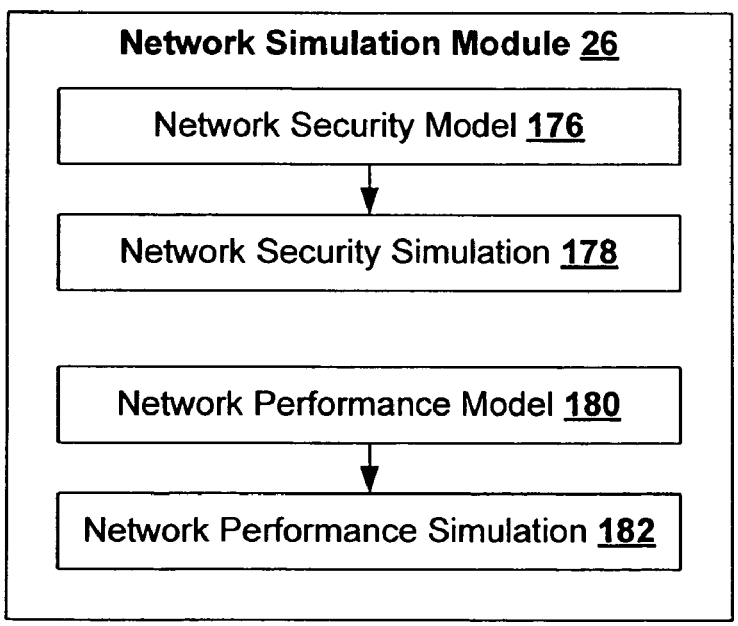
FIG. 7 is a schematic block diagram of one embodiment of a network simulation module associated with the networking device of FIG. 2.

Further, adaptive networking module 24 may then directly update networking database module 22 with the proposed networking and/or security data (Block 226), or it may test the proposed data to insure that it actually improves the performance or security of networking device 14 and/or does not harm the performance or security of other networking devices associated with system 10 (Block 216). In order to perform the test, adaptive networking module 24 sends the proposed data to network simulator module 26, which incorporates the proposed data into a network model to predict network performance and/or security. Simulator module 26 sends the simulation results back to adaptive module 24 in the form of a simulated network data, which includes simulated performance data 182 (FIG. 7) and/or simulated security data 178 (FIG. 7). Adaptive module 24 then compares the simulated performance and/or security data 178, 182 with the actual, existing performance and security data 98, 100 (FIG. 2) to determine if there is a resulting improvement in performance or security of networking device 14 or system 10 (Blocks 218 and 220). Adaptive networking module 24 may perform one or more iterations of generating proposed data and comparing the subsequent simulated results with the status quo in order to determine an optimized result (Block 222). If there is not a resulting improvement, then the adaptive processing ends (Block 224). If there is a resulting improvement, then adaptive networking module 24 changes networking database module 22 to incorporate the proposed networking and/or security data in the form of a change to configuration data 93

(Block 226). And, as discussed above, these database changes are then synchronized throughout the network via the replication process.

Figure 11:
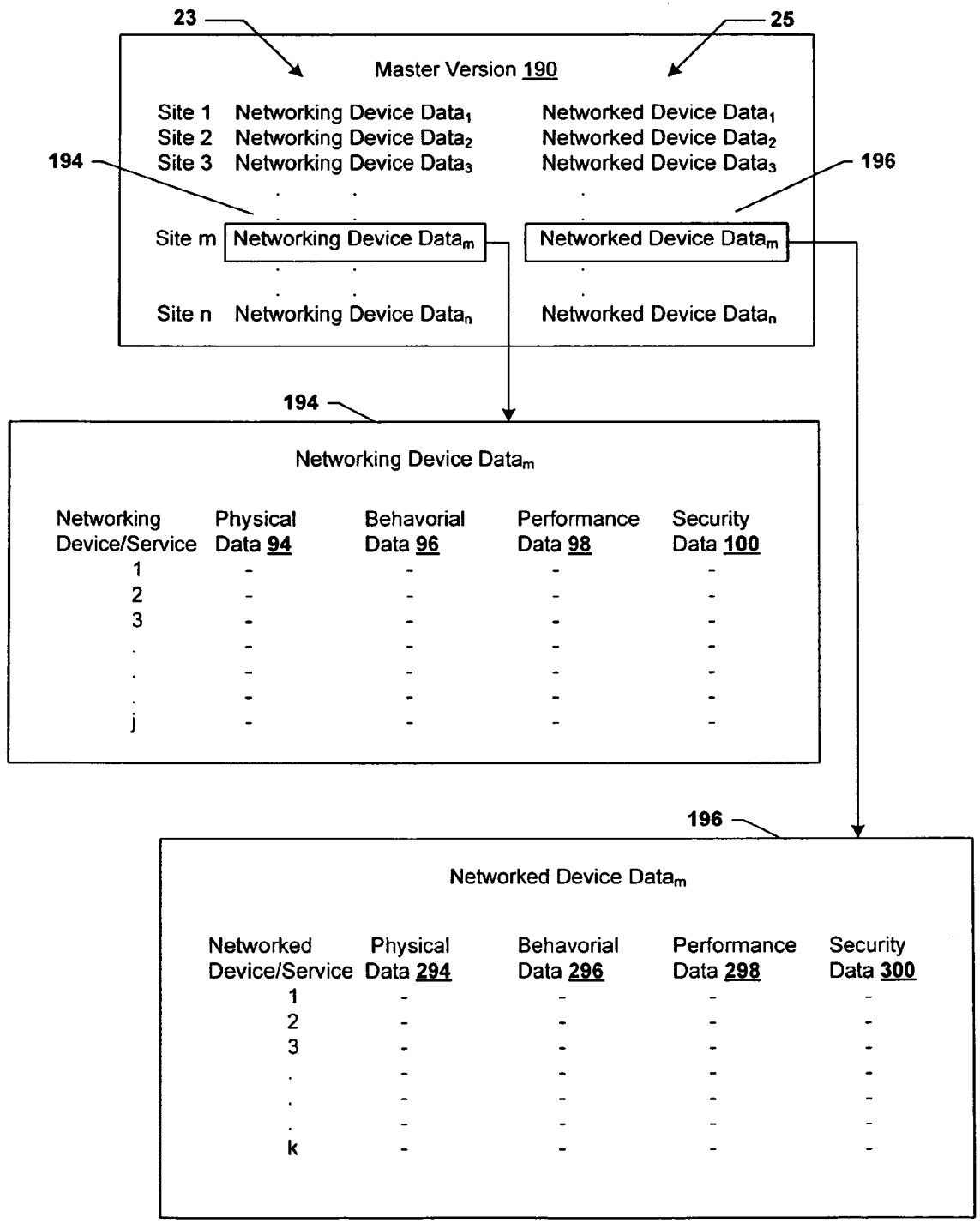
FIG. 11 is a schematic representation of the structural details of one embodiment of the master version of the data repository of FIG. 10.

Further, referring to FIGS. 10 and 11, and as discussed above, master version 190 of networking database module 22 includes networking device data 23. Networking device data 23 includes a plurality of site-specific networking device data 194, i.e. the physical data 94, behavioral data 96, performance data 98 and/or security data 100 associated with each respective networking device, service and/or application located at the given site 16. All of the site-specific networking device data 194 is gathered at the master site, and replicated to the distributed sites to synchronize all networking database modules 22 across network 18.

In another embodiment, referring to FIGS. 2, 10 and 11, networking database module 22 may further include local networked device data 25, including networking and/or security data for all networked devices 20 at each of the predetermined sites/nodes 16 on communications network 18. The networked device data 25 may include any data relating to operational networking and security characteristics of each networked device 20, such as networked device configuration-related data 193 and networked device status-related data 197. In particular, local networked device data 25 includes a plurality of site-specific networked device data 196 (FIGS. 10 and 11), i.e. physical data 294, behavioral data 296, performance data 298 and/or security data 300 associated with each respective networked device 20 at the given site 16. In more general terms, site-specific networked device data 196 includes configuration data 193 and status-related data 197 for each networked device 20. Configuration data 193 includes data that identifies and governs predetermined components and functions associated with each networked device 20. Status-related data 197 includes data that defines a state or condition of a given networked device 20. In one embodiment, for example, configuration data 193 includes: physical data 294 that identifies each site 16 and each networked device 20, such as a physical location and IP address, a subnet mask, and a gateway IP address; and behavioral data 296 that governs one or more functionalities of each networked device 20. In one embodiment, status-related data 197 includes: performance data 298 that documents the actual operation and execution of one or more functions of each networked device 20, such as device status, device usage, device throughput, such as the aggregate performance data for each network device on the wide area network; and security data 300 that details and tracks security-related information associated with each networked device 20, such as authentication, authorization and access control. All site-specific networked device data 196 is gathered at the master site, and, in one embodiment, each distributed site receives a replicated copy that includes its respective site-specific networked device data 196 along with any changes to networking device data 23, as discussed above. For example, this might occur when a user of management console 12 (FIG. 1) updates networking database module 22 with changes to the respective site-specific networked device data 196. It should be noted, however, that in other embodiments, each site 16 may receive a copy of the local networked device data 25 for all sites 16.

Figure 12:
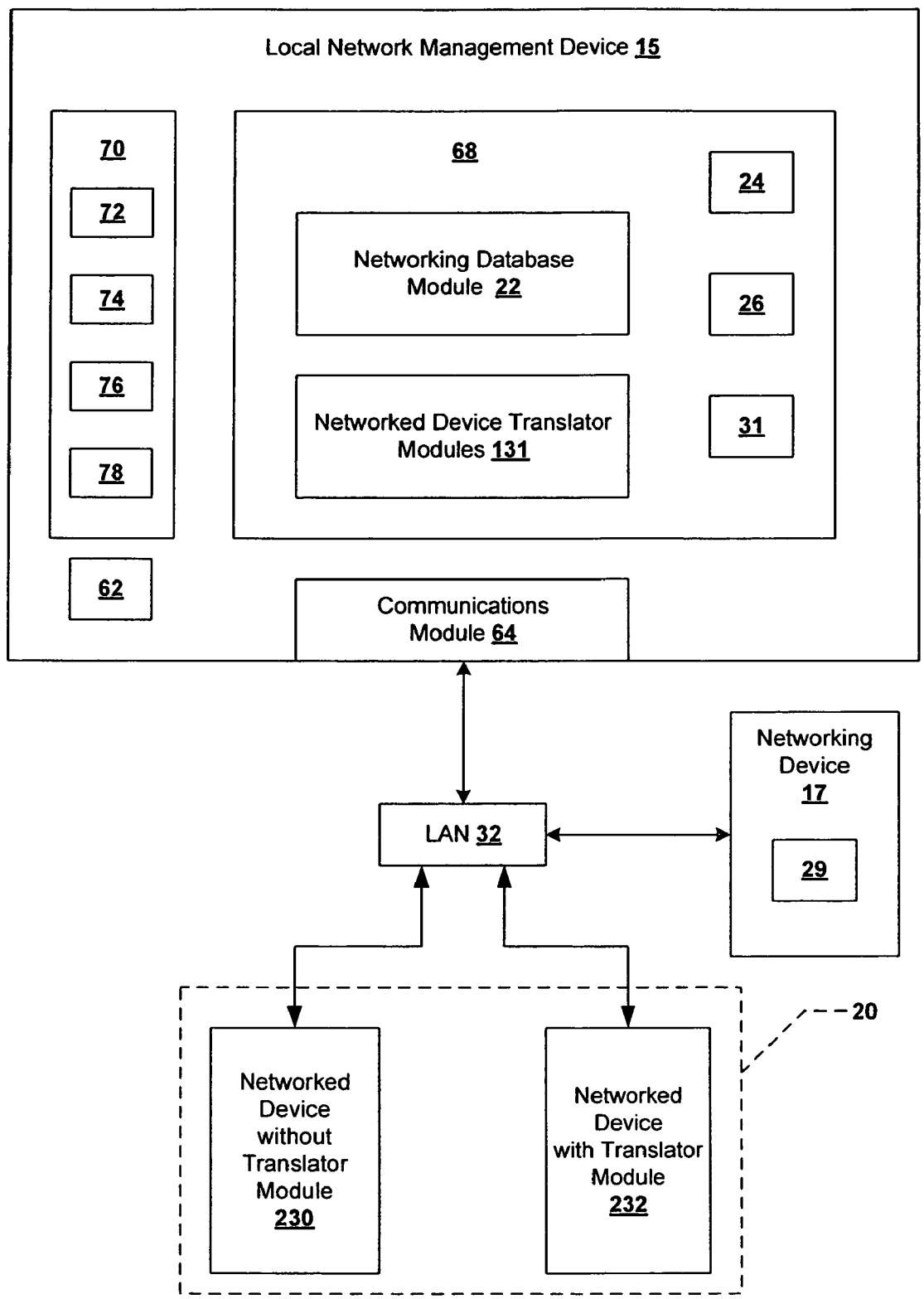
FIG. 12 is a schematic representation of one embodiment of the local network management device at one node of FIG. 1, and its relationship with the corresponding networking device and local networked devices at that node.

As mentioned above, although networking device 14 is one example of a computer system capable of carrying out the described embodiments, other computer systems may also be utilized. For example, referring to FIG. 12, in another embodiment, system 10 may further include a local network management device 15 on which networking database module 22 resides, and a separate networking device 17 that includes networking services module 29. As such, each respective networking device 17 carries out its predetermined networking functionality/functionalities, while local network management device 15 is operable to execute networking database module 22 in the manner described above. For example, local network management device 15 may be a computer including similar hardware, software, firmware, executable instructions, etc. as discussed above with regard to networking device 14 (FIG. 2), however, without the respective networking services module 29 and networking service applications/functions 150, which would reside on one or more independent and separate networking devices 17 at each site 16. Further, local network management device 15 may control networked devices 20, and may include one or more networked device translator modules 131, similar to translator modules 31 described above, to convert network-level commands, protocols and data from networking database module 22 into device-specific commands, protocols and data for distribution to networked devices without resident translator modules 230. On the other hand, networked devices with translator modules 232 may received the commands, protocols and data directly from networking database module 22.

While the various described embodiments have been illustrated and described, it will be clear that the present invention is not limited to these embodiments only. Numerous modifications, changes, variations, substitutions and equivalents will be apparent to those skilled in the art without departing from the spirit and scope of the present invention as described in the following claims.

What is claimed is:

1. A decentralized network management system, comprising:
   a networking database module disposed at least two of a plurality of nodes of a communications network, each networking database module comprising a data repository having a plurality of networking device configuration data corresponding to a local networking device and a plurality of remotely-located peer networking devices each associated with one of the plurality of nodes, wherein the local networking device and each remotely-located peer networking device operates or manages communications for one or more networked devices at a corresponding one of the plurality of nodes according to at least a portion of the plurality of networking device configuration data;
   an adaptive networking module disposed at the at least two of the plurality of nodes and operable to receive actual performance data or actual security data associated with a corresponding one of the plurality of peer networking devices, each adaptive networking module further operable to generate new networking device configuration data based on the actual performance data or the actual security data and based on determining that the new networking device configuration data improves local networking device performance or security and remotely-located networking device performance or security by taking into account the plurality of networking device configuration data of both the local networking device and the plurality of remotely-located peer networking devices, wherein the new networking device configuration data is different from the plurality of networking device configuration data; and
   a replication module disposed at the at least two of the plurality of nodes, wherein each replication module is operable in a two-way, decentralized manner to update the plurality of networking device configuration data with the new networking device configuration data generated at or received at the corresponding node, and to transmit the new networking device configuration data generated at the corresponding node to another replication module at, at least, one other one of the plurality of nodes to synchronize the plurality of networking device configuration data for the plurality of peer networking devices between the respective nodes, wherein the local networking device or one of the remotely-located peer networking devices operates or manages communications for one or more networked devices at the corresponding one of the plurality of nodes according to the new networking device configuration data.

2. The system of claim 1, wherein the new networking device configuration data is transmitted from the respective one of the plurality of nodes at which the new networking device configuration data is generated to every other one of the plurality of nodes.

3. The system of claim 1, wherein each of the plurality of networking device configuration data comprises a set of operational data suitable to control a functionality of the respective peer networking device.

4. The system of claim 1, wherein each of the plurality of networking device configuration data comprises at least one of physical data and behavioral data, wherein the physical data comprises data associated with an identification of the respective node or the respective peer networking device and the behavioral data comprises data associated with one or more rules, configurations, or settings that control a function of the respective peer networking device.

5. The system of claim 1, wherein the data repository further comprises status-related data associated with a networking performance status or a security status of at least one of the plurality of peer networking devices, wherein the status-related data comprises the actual performance data or the actual security data.

6. The system of claim 1, wherein the data repository comprises data selected from the group consisting of routing data, firewall data, virtual private network data, encryption key data, proxy gateway data, intrusion detection data, intrusion prevention data, network forensic data, vulnerability assessment data, anti-virus data, content filter data, network anomaly data, authentication data, access control data, authorization data, spam filter data, application filter data, media access control address filter data, port filter data, physical site data, network site data, protocol data, network performance data, network control data, web cache data, quality of service data, banned data, trusted data, dynamic host control protocol data, networking information data, communication protocol data, and distributed site data.

7. The system of claim 1, wherein the communications network comprises a public communications network, and wherein a group of the plurality of peer networking devices at ones of the plurality of nodes distributed across the public communications network defines a wide area network.

8. The system of claim 1, further comprising a network management module operable to change the networking device configuration data associated with at least one of the plurality of peer networking devices corresponding to one of the plurality of nodes.

9. The system of claim 1, further comprising a network simulation module having at least one network model operable to receive the new networking device configuration data and generate simulated performance data or simulated security data.

10. The system of claim 9, further comprising a data analyzer operable to compare the simulated performance data or the simulated security data to the actual performance data or the actual security data, respectively, and determine if the new networking device configuration data improves networking performance or networking security, respectively.

11. The system of claim 10, wherein the replication module is operable if the new networking device configuration data improves the networking performance or the networking security, respectively.

12. The system of claim 1, further comprising a networking services module having at least one networking communication function.

13. The system of claim 12, wherein the networking communications function is selected from the group consisting of routing, quality of service, firewall, virtual private network, web cache, web filter, intrusion detection, performance monitoring, intrusion prevention, spam prevention, virus prevention, content filtering, network analysis, and broadband network communications optimization.

14. The system of claim 12, wherein the plurality of networking device configuration data comprise networking level instructions, wherein the networking services module further comprises at least one networking service application operable with service-specific instructions having a different protocol than the networking level instructions, and further comprising a translator module having a translator mechanism operable to receive the networking level instructions and generate the corresponding service-specific instructions.

15. A decentralized networking system, comprising:
a plurality of peer networking devices associated with a plurality of interconnected nodes of a communications network, wherein each of the plurality of nodes includes at least one of the plurality of peer networking devices, wherein each peer networking device operates or manages communications for one or more networked devices at a corresponding one of the plurality of nodes according to a corresponding set of networking device configuration data;
a networking database at least two of the plurality of nodes, wherein the networking database at a first one of the plurality of nodes comprises a first plurality of sets of networking device configuration data comprising a first set of at least one of networking data or security data associated with a first local networking device at the first node and each remotely-located one of the plurality of peer networking devices;
wherein the networking database at a second one of the plurality of nodes-comprises a second plurality of sets of networking device configuration data comprising a second set of at least one of networking data or security data associated with a second networking device at the second node and each remotely-located one of the plurality of peer networking devices;
an adaptive networking module disposed at the at least two of the plurality of nodes and operable to receive actual performance data or actual security data associated with a corresponding one of the plurality of peer networking devices, each adaptive networking module further operable to generate new networking device configuration data based on the actual performance data or the actual security data and based on determining that the new networking device configuration data improves local networking device performance or security and remotely-located networking device performance or security by taking into account the plurality of networking device configuration data of both the local networking device and the plurality of remotely-located peer networking devices, wherein the new networking device configuration data is different from the first or second plurality of sets of networking device configuration data; and a replication module at the at least two of the plurality of nodes, wherein each replication module is operable in a two-way, decentralized manner to update the respective plurality of sets of networking device configuration data with the new networking device configuration data generated at or received at the corresponding node, and to transmit the new networking device configuration data generated at the corresponding node to another replication module at, at least, one other one of the plurality of nodes to synchronize the first plurality of sets of networking device configuration data and the second plurality of sets of networking device configuration data, wherein a local one or a remote one of the plurality of peer networking device operates or manages communications for one or more networked devices at the corresponding one of the plurality of nodes according to the new networking device configuration data.

16. A decentralized method of managing a communications network, comprising:

maintaining a data repository at least two of a plurality of nodes each having at least one peer networking device, where each data repository comprises networking device configuration data associated with a local peer networking device and each remotely-located peer networking device at each of the plurality of nodes, wherein each peer networking device operates or manages communications for one or more networked devices at a corresponding one of the plurality of nodes according to at least a portion of the networking device configuration data;

receiving or generating, at any one of the at least two of the plurality of nodes, new networking device configuration data based on actual performance data or actual security data and based on determining that the new networking device configuration data improves local networking device performance or security and remotely-located networking device performance or security by taking into account the networking device configuration data of both the local peer networking device and the plurality of remotely-located peer networking devices, wherein the new networking device configuration data is different from the networking device configuration data; and updating, in a two-way, decentralized manner, the networking device configuration data with the new networking device configuration data generated at or received at the corresponding node, and transmitting the new networking device configuration data if generated at the corresponding node to at least one other one of the plurality of nodes, to synchronize the networking device configuration data for the corresponding peer networking devices, wherein the local networking device or one of the remotely-located peer networking devices operates or manages communications for one or more networked devices at the corresponding one of the plurality of nodes according to the new networking device configuration data.

17. A decentralized method of adaptive networking, comprising:

receiving, at any one of a plurality of nodes each having a corresponding one of a plurality of peer networking devices in a communications network, performance data or security data associated with the corresponding local peer networking device, wherein the plurality of peer networking devices each operates or manage communications for one or more networked devices at the respective node according to at least a portion of a plurality of networking device configuration data;

comparing, at any one of the plurality of nodes, the received performance data or security data to a standard and identifying anomalous data;

generating, at any one of the plurality of nodes, proposed performance-related networking device configuration data or proposed security-related networking device configuration data based on the identified anomalous data and based on determining that the proposed performance-related or security-related networking device configuration data improves local networking device performance or security and remotely-located networking device performance or security by taking into account the plurality of networking device configuration data of both the local peer networking device and the remotely-located ones of the plurality of peer networking devices, where the proposed performance-related networking device configuration data or the proposed security-related networking device configuration data respectively results in new performance data or new security data falling within the standard; and causing, at any one of the plurality of nodes in a two-way, decentralized manner, synchronization of a data repository at each of the plurality of nodes and associated with each of the plurality of peer networking devices, with the proposed performance-related networking device configuration data or proposed security-related networking device configuration data generated by the local networking device or by one of the remotely-located networking devices, wherein the data repository at each of the plurality of nodes comprises the plurality of networking device configuration data for each of the plurality of peer networking devices, wherein the local networking device or one of the remotely-located networking devices operates or manages communications for one or more networked devices at the corresponding one of the plurality of nodes according to the proposed performance-related networking device configuration data or proposed security-related networking device configuration data.

18. The method of claim 17, further comprising iteratively generating the proposed performance-related networking device configuration data or proposed security-related networking device configuration data until an optimized performance-related networking device configuration data or optimized security-related networking device configuration data is achieved.

19. The method of claim 17, further comprising generating simulated performance data or simulated security data to predict the new performance data or the new security data.

20. A computer program product, comprising:

a non-transitory computer-usable medium having control logic stored therein for causing a computer to manage networking information in a decentralized manner, the control logic comprising:

first computer readable program code for maintaining a data repository at least two of a plurality of nodes each having at least one peer networking device, where each data repository comprises networking device configuration data associated with a local peer networking device and each remotely-located peer networking device at each of the plurality of nodes, wherein each peer networking device operates or manages communications for one or more networked devices at a corresponding one of the plurality of nodes according to at least a portion of the networking device configuration data;

second computer readable program code for receiving or generating, at any one of the at least two of the plurality of nodes, new networking device configuration data based on actual performance data or actual security data and based on determining that the new networking device configuration data improves local networking device performance or security and remotely-located networking device performance or security by taking into account the networking device configuration data of both the local peer networking device and the plurality of remotely-located peer networking devices, wherein the new networking device configuration data is different from the networking device configuration data; and third computer readable program code for updating, in a two-way, decentralized manner, the networking device configuration data with the new networking device configuration data generated at or received at the corresponding node, and transmitting the new networking device configuration data if generated at the corresponding node to at least one other one of the plurality of nodes, to synchronize the networking device configuration data for the corresponding peer networking devices, wherein the local networking device or one of the remotely-located peer networking devices operates or manages communications for one or more networked devices at the corresponding one of the plurality of nodes according to the new networking device configuration data.

21. A computer program product, comprising:

a non-transitory computer-usable medium having control logic stored therein for causing a computer to adaptively manage networking information in a decentralized manner, the control logic comprising:

first computer readable program code for receiving, at any one node of a plurality of nodes having a corresponding one of a plurality of peer networking devices in a communications network, performance data or security data associated with the corresponding local peer networking device, wherein the plurality of peer networking devices each operates or manages communications for one or more networked devices at the respective node according to at least a portion of a plurality of networking device configuration data;

second computer readable program code for comparing, at any one node of the plurality of nodes, the received performance data or security data to a standard and identifying anomalous data;

third computer readable program code for generating, at any one node of the plurality of nodes, proposed performance-related networking device configuration data or proposed security-related networking device configuration data based on the identified anomalous data and based on determining that the proposed performance-related or security-related networking device configuration data improves local networking device performance or security and remotely-located networking device performance or security by taking into account the plurality of networking device configuration data of both the local peer networking device and the remotely-located ones of the plurality of peer networking devices, where the proposed performance-related networking device configuration data or the proposed security-related networking device configuration data respectively results in new performance data or new security data falling within the standard; and fourth computer readable program code for causing, at any one node of the plurality of nodes in a two-way, decentralized manner, synchronization of a data repository at each of the plurality of nodes and associated with each of the plurality of peer networking devices, with the proposed performance-related networking device configuration data or proposed security-related networking device configuration data generated by the local networking device or by one of the remotely-located networking devices, wherein the data repository at each of the plurality of nodes comprises the plurality of networking device configuration data for each of the plurality of peer networking devices, wherein the local networking device or one of the remotely-located networking devices operates or manages communications for one or more networked devices at the corresponding one of the plurality of nodes according to the proposed performance-related networking device configuration data or proposed security-related networking device configuration data.

22. The system of claim 1, wherein the data repository further comprises networked device data corresponding to a networked device.

23. The system of claim 12, further comprising a local network management device having a memory operable to store the networking database module and a processor operable to execute the adaptive networking module and the replication module.

24. The system of claim 23, wherein the data repository further comprises networked device data corresponding to a networked device.

25. The system of claim 1, wherein the adaptive networking module is operable to receive the actual security data corresponding to the local networking device, and wherein the adaptive networking module is further operable to generate new networking device configuration data for the local networking device based on the actual security data corresponding to the local networking device.

26. The system of claim 15, wherein the first set and the second set each comprise respective security data, and wherein the replication module is operable to synchronize each networking database such that the respective security data is identical.

27. The method of claim 16, wherein the networking device configuration data comprises security-related configuration data.

28. The method of claim 17, wherein the receiving and the comparing of the performance data or the security data further comprises receiving and comparing of the security data, wherein the generating further comprises generating the proposed security-related networking device configuration data, and wherein the causing synchronization further comprises causing synchronization with the proposed security-related networking device configuration data.

29. The computer program product of claim 20, wherein the networking device configuration data comprises security-related configuration data.

30. The computer program product of claim 21, wherein the code for receiving and the code for comparing of the performance data or the security data further comprises code receiving and code comparing of the security data, wherein the code for generating further comprises code for generating the proposed security-related networking device configuration data, and wherein the code for causing synchronization further comprises code for causing synchronization with the proposed security-related networking device configuration data.

* * * * *